Jan. 19, 1965  W. HARGREAVES  3,166,685
DUAL ENCAPSULATED STATORS
Filed Nov. 3, 1959
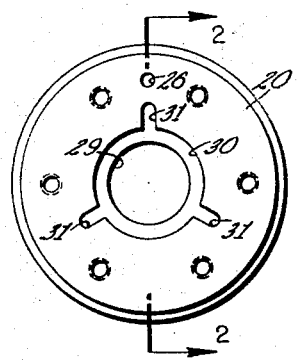
FIG. 1
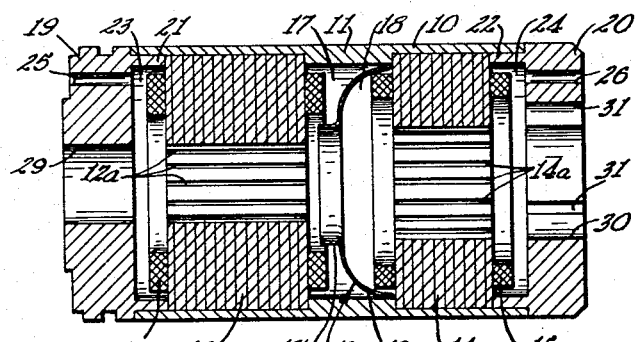
FIG. 2
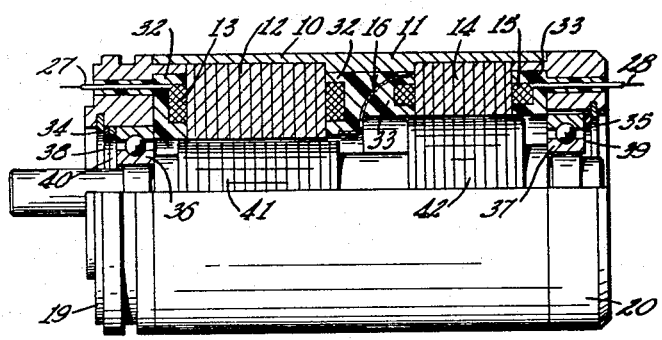
FIG. 3
INVENTOR
WILLIAM HARGREAVES
BY
ATTORNEY

United States Patent Office 3,166,685
Patented Jan. 19, 1965

3,166,685
DUAL ENCAPSULATED STATORS
William Hargreaves, Jenkintown, Pa., assignor, by mesne assignments, to Weston Instruments, Inc., a corporation of Texas
Filed Nov. 3, 1959, Ser. No. 850,585
7 Claims. (Cl. 310—43)

This invention relates to electrical motor, generator, and motor-generator type structures and to a method of assembly especially adapted for manufacturing such structures which require very high standards of mechanical and electrical accuracy.

There are a number of present day applications requiring the use of control apparatus employing motors, generators, motor-generators and like structures which are in the category of precision instruments. During manufacture, such structures require special assembly and manufacturing techniques in order that they will meet the high standards for which they are designed and thus be capable of providing the desired operating characteristics.

Precision motor, generator and motor-generator type structures of conventional mechanical design and manufacture according to usual manufacturing techniques are exceedingly expensive to manufacture, and not infrequently they operate satisfactorily for a period of time but then quite unexpectedly cause considerable operational difficulty or fail entirely. Such conditions are intolerable in the applications in which such precision structures are often used, since a failure of such structure may result in the failure of an entire system, resulting in a great loss of time, effort and money, depending upon the particular application in which the structure is used.

Accordingly, it is an object of this invention to provide an electric motor and motor-generator type structure which will conform to rigid electrical and mechanical tolerances and which will be capable of a long useful life and have greater reliability in operation during that life than such structures presently used.

It is another object to provide a relatively simple method of manufacturing such structures in a manner which will result in their suitability for use in applications requiring rigid electrical and mechanical tolerances and extremely reliable operation.

Other objects of this invention, and various features and advantages thereof, will become apparent from a reading of the specification and claims taken in conjunction with the accompanying drawings, in which:

FIGURE 1 is an end view of the stator assembly of a motor-generator structure made in accordance with the principles of this invention, shown at a point during its manufacture before application of bonding material to the assembly, FIGURE 2 is a cross section taken along the line 2—2 of FIGURE 1, and FIGURE 3 is a cross section of the stator assembly in FIGURE 2 shown after being filled with a bonding material and machined, and showing details of the armature and bearing assemblies at each end.

In accordance with the invention there is provided an electrical motor type structure comprising a first stator in the form of an annular core and having windings supported thereon and coil ends protruding therefrom. A second stator is also provided in the form of an annular core and having windings supported thereon and coil ends protruding therefrom. These two cores are in substantial axial alignment with each other and are secured in spaced relationship with their inner ends disposed substantially opposite one another. There is also provided a shield located between the two stators for separating one from the other, this shield being provided with an aperture.

The assembly further includes a first end cap secured in fixed relationship with the outer end of the first core and a second end cap secured in fixed relationship with the outer end of the second core which serve as armature bearing supports. These end caps also cooperate with a housing which substantially surrounds the stators, for containing a bonding material, as will hereinafter appear.

According to the method of manufacture herein contemplated, the various parts of the structure are assembled and held in position and a filling of a suitable bonding material is introduced into the region of the first stator between the shield and the first end cap. The entire assembly is then spun, and heated if desired, to distribute the material in the region of the first stator until it has an inside diameter established by the aperture in the shield, all excess bonding material being transferred, as a result of the centrifugal force of the spinning assembly, into the region of the second stator between the shield and the second end cap, where it assumes an inside diameter determined by bleed means in the second end cap.

The bonding material is then cured in a suitable manner. When cured, a bond is formed by the fillings of bonding material between the various parts of the assembly, thereby forming the entire stator assembly into a single composite, integral unit. The inside surfaces of the stators are then machined and the end caps are also machined to thereby make their respective inside diameters accurately concentric with one another.

Referring now to the drawings, and particularly FIGURES 1 and 2, there is provided a housing 10 which may be cylindrical in shape and having a raised internal portion 11. A first stator made up of a core 12 of annular laminations, slotted to receive conventional stator coils 13 having coil ends extending beyond the ends of the core, is adapted to be fitted inside the housing 10 in abutting relationship with one end of the raised internal portion 11. A second stator having a core 14 similar to the first stator core 12 but having a larger inside diameter and also having windings 15 extending beyond the ends of the core 14 is adapted to be inserted into the housing 10 in abutting relationship with the other end of the internal housing portion 11. The cores 12 and 14 are provided with longitudinal slots 12a and 14a respectively.

In the space between adjacent oppositely disposed inner ends of the first and second stator cores, there is provided a shield 16 having preferably a bell shaped portion 16a and an annular shaped portion 16b. This shield has several functions. The bell shaped portion serves as an electrical isolation means between the two stators in order to reduce electrical interaction between them and also defines spaces 17 and 18 between the shield 16 and the oppositely disposed inner ends of each of the cores 12 and 14 respectively, into which the inner ends of each of the coils 13 and 15 respectively protrude. The annular shaped portion 16b of the shield 16 serves to determine the inside diameter of a bonding material which is introduced into the assembly, as will later appear.

The ends of the housing 10 are adapted to receive end caps 19 and 20 each having annular undercut flange portions 21 and 22 respectively to provide a fit with the housing 10 at each end. Each end cap 19 and 20 is positioned to be in spaced relationship with the outer end of the cores 12 and 14 respectively, to thus define spaces 23 and 24 which respectively receive the outer ends of the coils 13 and 15.

The end caps 19 and 20 are also provided respectively with holes 25 and 26 for receiving the terminal wires 27 and 28 from the first and second stator coils 13 and 15. Each of the end caps 19 and 20 is also provided respectively with central openings or apertures 29 and 30 which are subsequently machined to provide a support for a pair of armature bearings as will later appear. The central aperture opening 29 in the end cap 19 has a diameter substantially smaller than the inside diameter of the annular shaped portion 16b of the shield 16. The aperture 30 must have a diameter which will permit the insertion of the larger armature to be associated with the second stator core 14 and is provided with notches 31 spaced at an equal distance radially from the center of the aperture. The apertures 29 and 30 and also the inside diameters of the stator cores 12 and 14 must be sufficiently small to allow subsequent machining to the diameters ultimately desired.

After the stator structure is assembled as described above and shown in FIGURES 1 and 2, it is mounted in a spinnable fixture (not shown) adapted to clamp the end caps to the housing. Any parts which might be subject to shifting such as the stators or the shield, can be held in position by a suitable cement. The spinnable fixture and assembly are then rotated together about the axis through the center of the assembly. A thermosetting bonding material having good electrical insulating properties is then introduced into the assembly in a radial direction in the region of the first stator core 12. This bonding material could also be introduced before the spinning operation, if desired. The centrifugal forces produced as a result of the rotation of the assembly causes the bonding material to flow into the spaces 17 and 23, around the ends of the coils 13. The flow of material is facilitated by the longitudinal slots 12a and 14a disposed at the inner surface of the cores. As more material is introduced into the region of the first stator core 12, the spaces 17 and 23 are filled in toward the center until the filling of bonding material 32 thus produced (see FIGURE 3) has an inside diameter determined by the inside diameter of the annular shaped portion 16b of the shield 16. The excess material is bled off as it were, from the region of the stator core 12 into the region of the larger inner diameter stator core 14 until the spaces 18 and 24 around the ends of the coil 15 are filled and until the filling of bonding material 33 thus produced in the region of the core 14 has an inside diameter determined by the bleed notches 31 in the end cap 20, which allows any excess bonding material to be bled outside the assembly.

It is important that the inside diameter of the annular shaped portion 16b of the shield 16 be slightly larger than the diameter to which the stator core 12 will be machined; it is important also that the bleed notches 31 in the end cap 20 be located a radial distance from the center of the aperture 30 sufficient to cause the filling of bonding material 33, in the region of the stator core 14 to assume an inside diameter slightly larger than the diameter to which the stator core 14 will be machined. These are important considerations since the thermal coefficient of expansion of the bonding material is generally considerably greater than that of the stator core material and therefore if these diameter differentials are ignored, difficulty will result during operation of the units.

The bonding material may be made to flow more easily and thus be distributed more evenly and completely during the spinning operation by the application of heat.

The bonding or filling material is then cured, for example, by the application of controlled heat for the proper length of time, during which the fillings 32 and 33 become hardened and form a bond between the various assembly parts, thus producing a rigid composite unit. The assembly can then be removed from the rotatable fixture for machine finishing. To accomplish this the assembly is mounted in a lathe on its approximate longitudinal axis and the internal diameters of the cores 12 and 14 and also of the end caps 19 and 20 are machined to the proper size.

Internal grooves can then be machined in the end caps 19 and 20 to receive snap rings 34 and 35 which serve to lock conventional ball bearings 36 and 37 within the caps 19 and 20 respectively. Washers 38 and 39, and if desired, an extra washer 40, may be provided for accurately positioning the bearings 36 and 37.

From the foregoing description, it will be apparent that the bonding material will serve to fasten and support the end caps 19 and 20 with respect to the cores 12 and 14. The end caps, in turn, serve to support the bearings 36 and 37 which, in turn, support armatures 41 and 42 which are respectively associated with the first and second stator cores 12 and 14. Since all of the external and internal diameters are machined after the end caps are bonded to the cores 12 and 14, the armatures 41 and 42 are positioned with extreme accuracy with respect to their respective stator cores. Not only is the centering of the rotors extremely accurate with this construction but also longitudinal alignment of the rotor with the cores is also extremely accurate. This is because the snap ring receiving grooves are not machined until after the end caps are bonded to the cores.

The invention disclosed herein represents a considerable improvement in manufacturing technique adapted to making motor, motor-generator and like structures where a plurality of stator elements having cores with different inside diameters are embodied as a part of one assembly. The use of the separating shield having an aperture of predetermined size between the different diameter stators when employed with a centrifugal spinning operation for establishing or limiting the inside diameter of the filling of bonding material in the smaller stator section, makes possible the manufacture of plural stator core assemblies for precision units of very high quality on a mass production basis.

Additionally, by closely predetermining the size of the inside diameter of the annular portion 16b of the shield 16, the inside diameter of the filling of bonding material can be determined in a simple manner, without the necessity of resorting to the usual troublesome, inaccurate and time consuming methods such as introducing what is hoped to be the right amount of bonding material into the assembly. It should be noted here that the technique described herein could also be accomplished by a shield having a single non-central aperture, or with a series of apertures located equidistant from the center of the shield.

Another advantage of this invention is that the metal particles which are produced inside the assembly during the subsequent stator machining operation cannot become lodged in the stator coils and thus result either in greater shrinkage during manufacture or in troublesome operation later, since the coils are completely embedded in the bonding material before the machining operation.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. An electrical motor type structure comprising a first stator including a first annular core with windings supported thereon, a second stator including a second annular core with windings supported thereon, said first and second cores being in substantial axial alignment with one another and also being secured in spaced relationship with their inner ends disposed substantially opposite one another, a shield disposed between said cores and provided with a central aperture having a diameter greater than the inner diameter of said first stator core, a first end cap secured in fixed relationship with the outer end of said first core, a second end cap secured in fixed relationship with the outer end of said second core, a first filling of bonding material in the region between said shield and said first end cap, a second filling of bonding material in the region between said shield and said second end cap, said first filling having a different internal diameter than said second filling and having an internal diameter larger than said inner diameter of said first stator core and being established by said aperture in said shield.

2. An electrical motor type structure comprising a first stator including a first annular core with windings supported thereon, a second stator including a second annular core with windings supported thereon, said first and second cores being in substantial axial alignment with one another and also being secured in spaced relationship wiht their inner ends disposed substantially opposite one another, a shield disposed between said stators including bleed means having an effective diameter with respect to the axes of said cores greater than the inner diameter of said first core, a first end cap secured in fixed relationship with the outer end of said first core, a second end cap secured in fixed relationship with the outer end of said second core, a first filling of bonding material in the region between said shield and said first end cap, and a second filling of bonding material in the region between said shield and said second end cap, one of said fillings having a different internal diameter than the other of said fillings and having an inner diameter larger than the inner diameter of said first core and being established by said bleed means in said shield.

3. An electrical motor type structure comprising a first stator including a first annular core with windings supported thereon, a second stator including a second annular core with windings supported thereon, said first and second cores being in axial alignment with one another and also being secured in spaced relationship with their inner ends disposed opposite one another, a housing surrounding at least a portion of each of said stators, a shield with a central aperature of diameter greater than the inner diameter of said first annular core and being disposed between said cores, a first end cap secured in spaced relationship with the outer end of said first core, a second end cap secured in spaced relationship with the outer end of said second core, a first filling of bonding material in the region between said shield and said second end cap, said first and second fillings having different internal diameters with said first filling having an inner diameter larger than the inner diameter of said first core and established by said diameter of said shield, said fillings constituting a means of bonding the parts of said structure together to form an integral unit.

4. An electrical motor type structure comprising a first stator including a first annular core with windings supported thereon and coil ends protruding therefrom, a second stator including a second annular core with windings supported thereon and coil ends protruding therefrom, said first and second cores being in axial alignment with one another and also being secured in spaced relationship with one another to thus define a space between adjacent inner ends of said cores for housing a portion of each of said windings on said first and second cores, a shield with a central aperture of diameter greater than the inner diameter of said first annular core and being disposed between the windings on said first and second cores, a first end cap secured in spaced relationship with said first core to thus define a space between said first end cap and the outer end of said first core for housing a portion of said winding on said first core, a second end cap secured in spaced relationship with said second core to thus define a space between said second end cap and the outer end of said second core for housing a portion of said winding on said second core, a first filling of bonding material surrounding the portions of said windings in the spaces between said first shield and said first end cap, and a second filling of bonding material surrounding the portions of said windings in the spaces between said shield and said second end cap, said first and second fillings having different internal diameters with said first filling having an inner diameter larger than the inner diameter of said first core and established by said diameter of said shield and constituting a means of securing the various parts of said structure together to form an integral unit.

5. An electrical motor type structure comprising a first stator including a first annular core with windings supported thereon, a second stator including a second annular core with windings supported thereon, said first and second cores being in axial alignment with one another and also being secured in spaced relationship with their inner ends disposed opposite one another, a shield with a central aperture of diamater greater than the inner diameter of said first annular core and being disposed between said cores, a first end cap secured in spaced relationship with the outer end of said first core, a second end cap secured in spaced relationship with the outer end of said second core, a first filling of bonding material in the region between said shield and said first end cap and having a predetermined inside diameter determined by the size of said central aperture, and a second filling of bonding material in the region between said shield and said second end cap, said second filling having a predetermined inside diameter determined by a bleed means in said second end cap.

6. An electrical motor type structure comprising a first stator including a first annular core with windings supported thereon, a second stator including a second annular core with an internal diameter larger than that of said first core and having windings supported thereon, said first and second cores being in axial alignment with one another and also being secured in spaced relationship with one another to thus define a space between adjacent inner ends of said cores, a circumferential housing surrounding said cores, a shield disposed in the space between said first and second stators, said shield defining a space between said shield and each of said cores and comprising a bell shaped outer section and an annular shaped inner section having an inside diameter greater than the inner diameter of said first core, a first end cap cooperating with one end of said housing to thus define a space between said first end cap and the outer end of said first core, a second end cap having a central aperture and cooperating with the other end of said housing to thus define a space between said second end cap and the outer end of said second core, a first filling of bonding material in the spaces between said shield and said first end cap and having an inside diameter determined by the inside diameter of the annular shaped inner section of said shield, and a second filling of bonding material in the spaces between said shield and said second end cap and having an inside diameter larger than the inside diameter of said first filling and being determined by at least one bleed path in said second end cap located at the periphery of said second end cap aperture.

7. An electrical motor type structure comprising a first stator including a first annular core with windings supported thereon, a second stator including a second annular core with an internal diameter larger than that of said first core and having windings supported thereon, said first and second cores having longitudinal slots and being in axial alignment with one another and also being secured in spaced relationship with one another to thus define a space between adjacent inner ends of said cores, a circumferential housing surrounding said cores, a shield disposed in the space between said first and second stators, said shield defining a space between said shield and each of said cores and comprising a bell shaped outer section and an annular shaped inner section having a central aperture with a predetermined inside diameter slightly larger than the inside diameter of said first core but smaller than the diameter of said second core, a first end cap cooperating with one end of said housing to thus define a space between said first end cap and the outer end of said first core, a second end cap having a central aperature and cooperating with the other end of said housing to thus define a space between said second end cap and the outer end of said second core, a first filling of bonding material in the spaces between said shield and said first end cap and having an inside diameter determined by the inside diameter of the annular shaped inner section of said shield, and a second filling of bonding material in the spaces between said shield and said second end cap and having an inside diameter slightly larger than the inside diameter of said second annular core and being determined by a plurality of notches located on the periphery of said second end cap central aperture.

References Cited in the file of this patent

UNITED STATES PATENTS

| | | |
|---|---|---|
| 2,578,837 | Raney | Dec. 18, 1951 |
| 2,814,744 | Demetriou et al. | Nov. 26, 1957 |
| 2,860,266 | Schrader | Nov. 11, 1958 |
| 2,922,902 | Hargreaves | Jan. 26, 1960 |
| 2,970,249 | Mazur | Jan. 31, 1961 |

FOREIGN PATENTS

| | | |
|---|---|---|
| 852,104 | Germany | July 8, 1949 |